United States Patent [19]

Marcus

[11] Patent Number: 5,578,263
[45] Date of Patent: Nov. 26, 1996

[54] PARISON MOLDING METHOD WITH REDUCED MOLDING CYCLE TIMES

[76] Inventor: Paul Marcus, 6 Bayberry Dr., Saddle River, N.J. 07458

[21] Appl. No.: 496,438

[22] Filed: Jun. 29, 1995

Related U.S. Application Data

[60] Division of Ser. No. 282,530, Jul. 28, 1994, Pat. No. 5,501,593, which is a continuation-in-part of Ser. No. 224,042, Apr. 7, 1994, abandoned.

[51] Int. Cl.⁶ .................................................. B29C 45/72
[52] U.S. Cl. ............... 264/537; 264/297.2; 264/328.14; 425/526; 425/547
[58] Field of Search ...................... 264/297.2, 297.3, 264/532, 537, 328.14; 425/547, 552, 529, 526, 533, 534, 556, 537

[56] References Cited

U.S. PATENT DOCUMENTS

| | | |
|---|---|---|
| 3,972,976 | 8/1976 | Farrell ..................................... 264/537 |
| 4,061,705 | 12/1977 | Marcus ................................... 264/537 |
| 4,155,974 | 5/1979 | Valyi ...................................... 264/532 |
| 4,285,657 | 8/1981 | Ryder ..................................... 264/537 |
| 4,308,086 | 12/1981 | Valyi ...................................... 264/537 |
| 4,352,777 | 10/1982 | Valyi ...................................... 264/532 |
| 4,376,090 | 3/1983 | Marcus ................................... 264/537 |
| 4,604,258 | 8/1986 | Valyi ...................................... 264/537 |
| 4,950,152 | 8/1990 | Brun, Jr. et al. ......................... 264/537 |

Primary Examiner—Catherine Timm
Attorney, Agent, or Firm—Kane, Dalsimer, Sullivan, Kurucz, Levy, Eisele and Richard, LLP

[57] ABSTRACT

A parison injection molding apparatus and method injection molds parsons, transfers them to cooling stations and then ejection stations. While at the injection molding station, cooling stations and during transfer therebetween up to the time they are ejected, the parisons are continuously cooled.

5 Claims, 4 Drawing Sheets

PARISON MOLDING METHOD WITH REDUCED MOLDING CYCLE TIMES

This is a division of application Ser. No. 08/282,530, filed Jul. 28, 1994 now U.S. Pat. 5,501,593 which is a continuation-in-part of application Ser. No. 08/224,042 filed Apr. 7, 1994 now abandoned.

BACKGROUND OF THE INVENTION

The present invention is applicable to a two-stage process by which parisons are produced in an injection molding machine, cooled to room temperature, stored and later conveyed in bulk to a reheat, orientation—stretch and blow molding machine. In this manner, oriented hollow plastic bottles are formed. Polyethylene terephthalate (PET) is typical of the plastic material used.

Heretofore cooling of parisons during the first stage has been time consuming, resulting in inefficiency and poor productivity. However, sufficient cooling is indispensable if the parisons are to maintain their shape during later handling operations. Techniques proposed to date for cooling parisons often times created bottlenecks downstream from the injection molds thereby severely hampering productivity. Obviously, a high rate of production of parisons is important in commercial operation, and the rate at which the injection molding cycle can produce the parisons has been limited by the time taken to cool the parisons sufficiently to allow post molding handling without damage to the parison.

Typically, the hollow plastic parisons produced in the injection molding cycle have relatively thick walls and are molded with PET resin at relatively high temperatures. Consequently, after removal from the injection mold, the hollow parison must be cooled sufficiently to prevent deformation or adhesion to one another. However, the thick parison wall tends to trap heat. Cooling the parison in the injection mold by means of its contact with the cool mold surfaces quickly chills the inner and outer skin, but mold cooling will remove the heat trapped within the wall only by keeping the parison in the injection mold for an extended period of time. Naturally, this is economically prohibitive because high parison production is not feasible unless cooling in the injection mold is held at a minimum.

Initial cooling of the molded parison following formation may be sufficient to permit ejection from the injection mold, but additional cooling is then immediately required to remove additional heat as it is conducted to the skin. If the additional cooling were omitted the skin temperature would rise and cause the molded parisons to stick together, to become prone to surface damage, or to bend or warp. Naturally this is unacceptable.

Many approaches have been proposed to alleviate these problems but they either were cost prohibitive, did not optimize injection molding cycles, required excessive parison handling or required cumbersome or highly inefficient dedicated equipment.

SUMMARY OF THE INVENTION

A principal object of the present invention is to provide a parison molding apparatus and method that is highly efficient, low in cost and that optimizes injection molding cycles thereby increasing parison production while at the same time providing adequate cooling of the molded parisons.

Another object is to provide a parison molding apparatus and method of the foregoing type that enables rapid operating cycles by parison injection molding without the necessity for extended cooling time in the injection mold but with extended cooling times outside the injection mold that may be increased many fold to arrive at the desired degree of parison cooling without affecting or detracting from the molding cycle or time.

In accordance with the proposed parison molding system a first parison is initially injection molded at an injection molding station about a first core rod assembly in an injection mold cavity defined with a female mold and a neck mold. This female mold, neck mold and core rod assembly possesses cooling means for cooling the molded parison. The first core rod assembly and neck mold then transports the slightly cooled parison to a first cooling station having a first cooling female mold and at which the first core rod assembly and neck mold remain with the first parison which is subject to further cooling. In this regard, the first core rod assembly may place the parison in intimate contact with the first cooling mold by a form of compression molding or by blowing the parison off the core rod into intimate contact with a slightly enlarged cavity wall of the cooling mold. A second core rod assembly and neck mold which were associated with a previously molded second parison at a second cooling station will be withdrawn from this second parison which will remain in a second cooling mold half and then moved to the injection molding station and associated with the injection mold. The withdrawal of the second core rod assembly and neck mold and insertion into the injection mold will occur simultaneously with retraction of the first core rod assembly and neck mold with the first molded parison and its transport and insertion into the first cooling mold at the first cooling station. The second parison at the second cooling station then receives a third core rod assembly for further cooling of the second parison. Upon the completion of the injection molding of the third parison at the injection molding station, the third core rod assembly is retracted with the second parison and moved to an ejection station at which the second parison is yet further cooled. The second core rod assembly and neck mold will transport the third parison to the second cooling station while the first core rod assembly and neck mold retracts from the first parison at the first cooling station and moves back to the injection molding station to mold a further parison. A fourth core rod assembly is inserted into the first parison at the first cooling station. Upon or shortly before completion of the injection molding of the fourth parison, the second cooled parison may be moved to yet another cooling station if needed or simply discharged or ejected at the ejection station if adequately cooled and deposited at a collection station. Simultaneously, the first parison will be placed at another ejection station for further cooling by the fourth core rod assembly. Thus, with all of the cooling steps established (at least 4) the injection molding cycle may be shortened to increase parison production several fold.

Other objects and advantages will become apparent from the following detailed description which is to be taken in conjunction with the accompanying drawings.

DETAILED DESCRIPTION OF THE PREFERRED EMBODIMENTS

Figure 1:
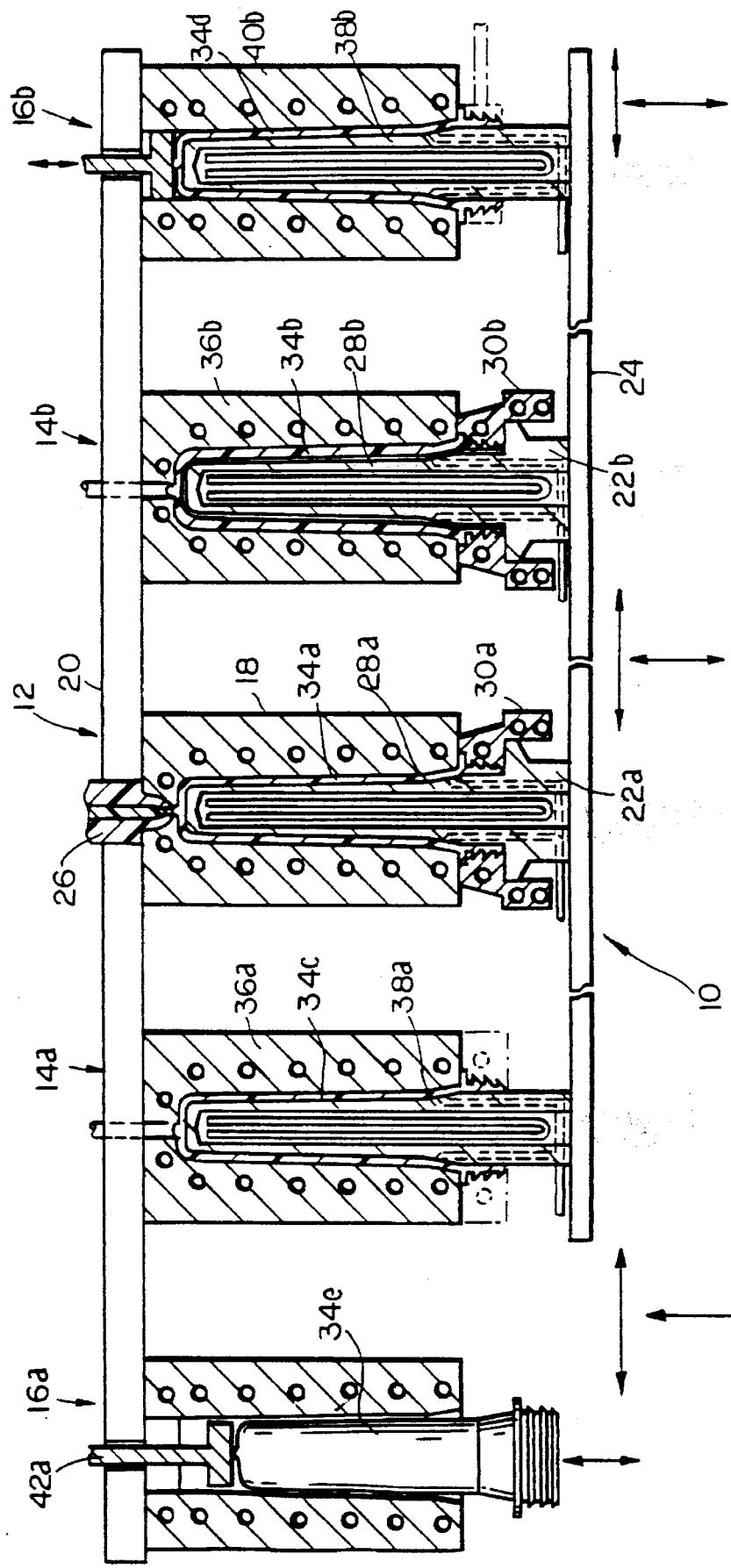
FIG. 1 is a top plan view of a parison molding and cooling apparatus showing the press in a closed or clamped position.

In the drawings, a parison molding machine 10 is illustrated with one of a plurality of in-line stations, namely, a parison molding station 12, a pair of parison cooling stations 14a and 14b on opposite sides of the parison molding station 12 and a pair of parison cooling and ejection stations 16a and 16b spaced outwardly of the respective cooling stations 14a and 14b. As will be readily apparent one or more additional cooling stations may be interposed between stations 14a,b and 16a,b to increase the cooling time of the parison while maintaining the molding cycle constant and at a minimum timewise.

The parison molding station 12 includes a parison mold 18 mounted on clamping plate 20 and that cooperates with a pair of core rod assemblies 22a and 22b mounted on an axially and laterally shiftable indexing plate 24 in forming a parison. In each molding cycle, one of the core rod assemblies is disposed within the cavity of mold 18 for purposes of receiving the injected plastic shot from nozzle 26. The core rod assemblies 22a and 22b include core rods 28a and 28b and associated split neck molds 30a and 30b. The mold 18, core rods 28a and 28b and neck molds 30a and 30b are temperature controlled and preferably cooled in a manner well known in the art by fluid (air, water or oil). For certain types of containers, a one-piece neck mold could be employed. The choice of neck mold depends on the size and shape of containers being formed. The selected neck mold will remain in a closed position except at such time as it is desired to disassociate the core assembly 22a or 22b from the parison at the cooling stations 14a and 14b so that the free core assembly may be in a position to return to the parison injection molding station 12 to form another parison.

Upon reciprocation of the indexing plate 24 and assuming the relative position of the parts as shown in FIG. 1, the parison mold 18 will be disposed about the core rod 28a into engagement with the closed neck mold 30a also disposed about the core rod 28a to define the parison forming cavity. The parison 34a is formed upon the injection through nozzle 26 into the cavity at the injection molding station 12 of the selected plastic under controlled pressure and temperature and with uniform density in a manner well known in the art.

The mold 18 is temperature controlled and preferably cooled by fluid (water or oil) in a manner well known in the art. The neck mold 30a is also cooled by fluid to set the configuration of the neck of the parison. The core rod 28a is similarly cooled by fluid. In this manner, a skin is formed on the outer and inner surfaces of the parison 34a. The cooling cycle time at the parison injection station 12 is held to a minimum to optimize the production of parisons.

At the relative disposition of the indexing plate 24 as shown in FIG. 1, the previously molded parison 34b on core rod assembly 22b is disposed at the cooling station 14b. At this station, parison 34b is placed in cooling mold 36b which is cooled by fluid (water or oil). Thus, at cooling station 14b the parison 34b will be cooled by mold 36b and will continue to be cooled by core rod 28b and neck mold 30b for the duration of the injection molding cycle. In this regard, the parison 34b may be in intimate contact with the core rod 28b and cooling mold 36b similar to a form of compression molding. However, as shown, the parison 34b is blown off the core rod 28b into intimate contact with the slightly enlarged core cavity surfaces of cooling mold 36b at the beginning of the cooling cycle. The previously molded and cooled parison 34c at the cooling station 14a will have been disassociated earlier from core rod assembly 22a and neck mold 30a. At the station 14a, parison 34c will continue to be cooled in mold 36a and by the engaged transfer core rod assembly 38a which can also be cooled by fluid (water or oil) in a manner similar to core rod assemblies 22a and 22b. Again, the cooling at station 14a about core rod assembly 38a will be for the duration of the injection molding cycle. The core rod assembly 38a can be on indexing plate 24 or on a separate plate if it is desired to remove the parisons further away from molding station 12 and cooling station 14a and 14b when they are transferred to ejection stations 16a and 16b. The earlier cooled and transferred parison 34d on transfer core rod assembly 38b will be at ejection station 16b at which the parison will be further cooled in mold 40b which is cooled by fluid (water or oil) while also being cooled on core rod assembly 38b. The previous parison 34e at ejection station 16a will be disassociated from core rod assembly 38a but further cooled in mold. At or near the end of the injection molding cycle, or certainly before core rod assembly 38a transfers parison 34c to station 16a, an ejection mechanism 42a will push or otherwise eject the parison 34e to a collection bin or station (not shown). As stated, one or more additional cooling stations similar to stations 14a and 14b may be interposed between these stations and ejection stations 16a and 16b to provide for further cooling of the parisons.

Figure 2:
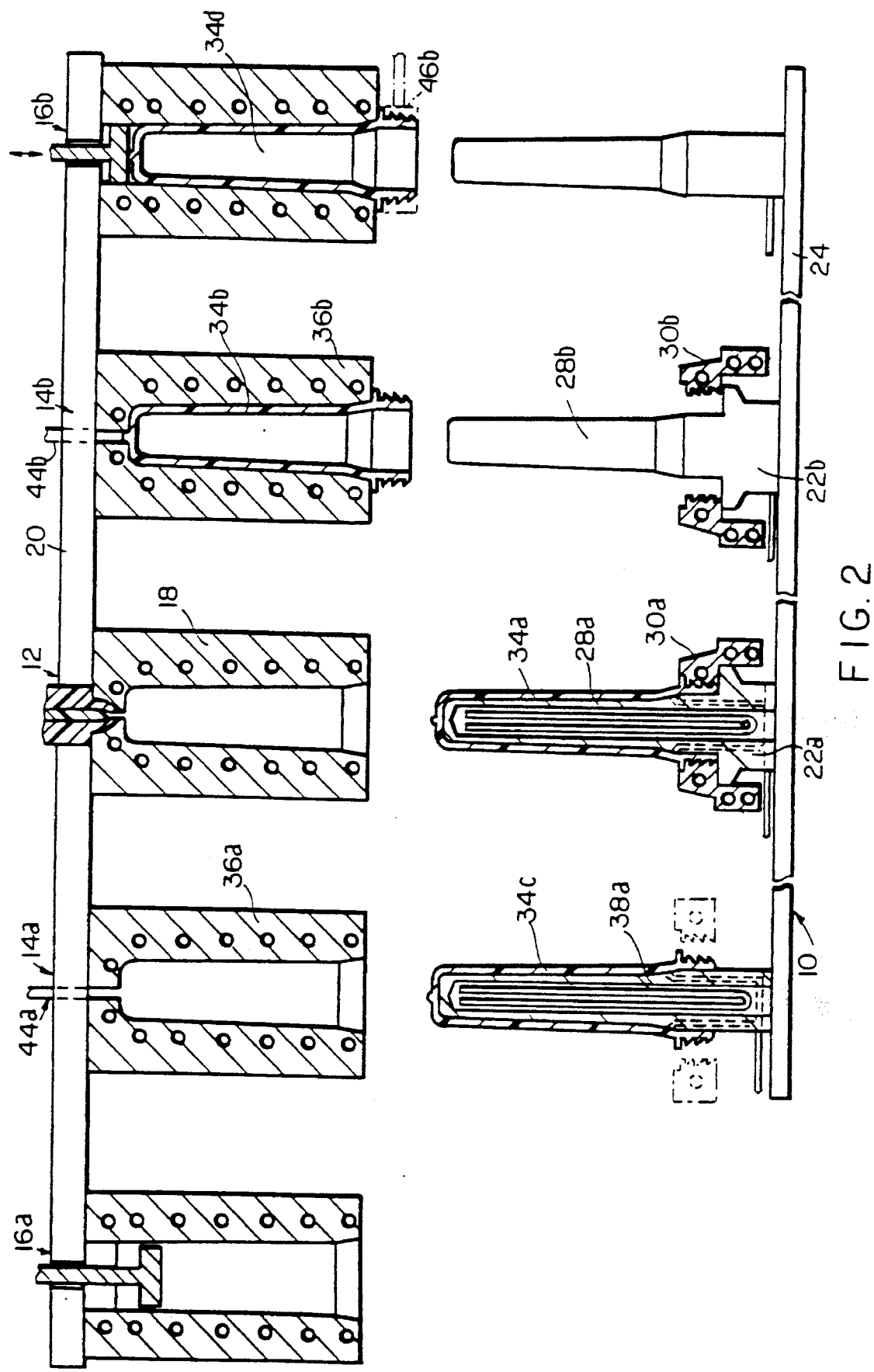
FIG. 2 is a similar top plan view of the press opened.

At the completion of the injection molding cycle, the indexing plate 24 is retracted to the position shown in FIG. 2. As shown, parison 34a will be retracted with core rod assembly 22a and closed neck mold 30a. Prior to the retraction of plate 24, the neck mold 30b will have opened thereby permitting the open neck mold and core rod 28b to be retracted and leave remaining in mold 36b the parison 34b. In this regard, the core rod 28b may have air jets, ports or longitudinal channels or spaces as shown that with a blast of air, will free the parison 34b from the core rod 28b or suction through port 44b may be used for this purpose or be used in conjunction with the air jets. When the cooling mold is slightly larger than the outer dimensions of the parison, this freeing of the parison from the core rod into contact with the shield will occur at the beginning of the cooling cycle. The parison 34c is removed from mold 36a and retracted with transfer core rod assembly 38a. In this instance, pressurized air through port 44a, may be used to free parison 34c from mold 36a or even suction ports on core rod assembly 38a may be used for this purpose alone or in conjunction with air pressure through port 44a. The parison 34d will remain at station 16b and in mold 40b and be free of core rod assembly 38b; and this removal could be achieved or facilitated by air pressure passing through core rod assembly 38b or a plunger activated abutment 46b, shown in phantom, which is activated immediately before retraction of the indexing plate 24 and retracted thereafter. The parison 34e can be ejected at any time prior to transfer of parison 34c by core rod assembly 38a to station 16a.

Figure 3:
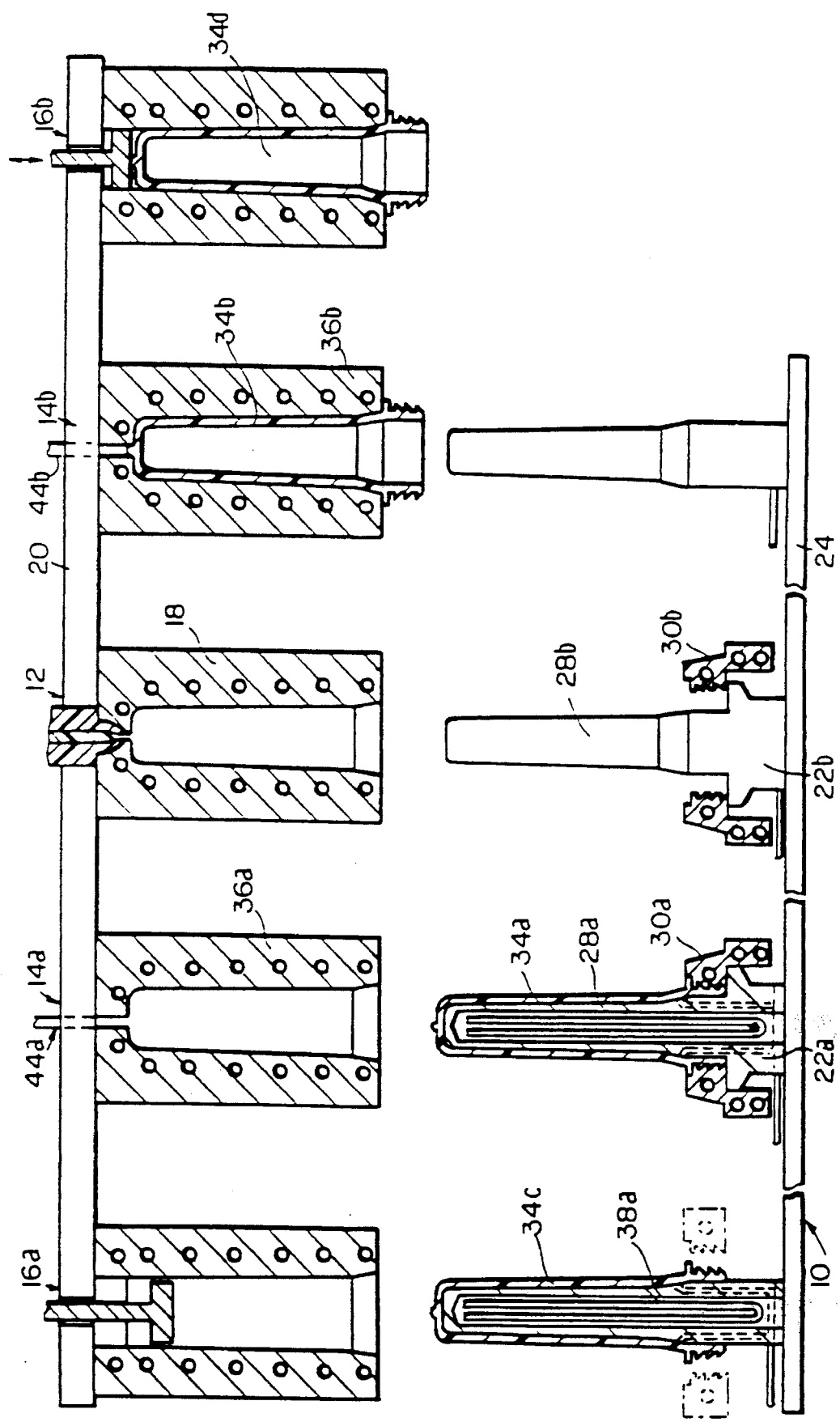
FIG. 3 is a similar plan view with the press still opened but linearly shifted and indexed to the left to align a core rod assembly with the injection mold and align the other core rod assemblies as shown.

The indexing pate 24 will then be shifted laterally so that core rod assembly 22b will be axially aligned with mold 18 at the injection molding station 12 and the other core rods will be aligned as shown in FIG. 3. Even during this indexing step, the various parisons will be further cooled.

Figure 4:
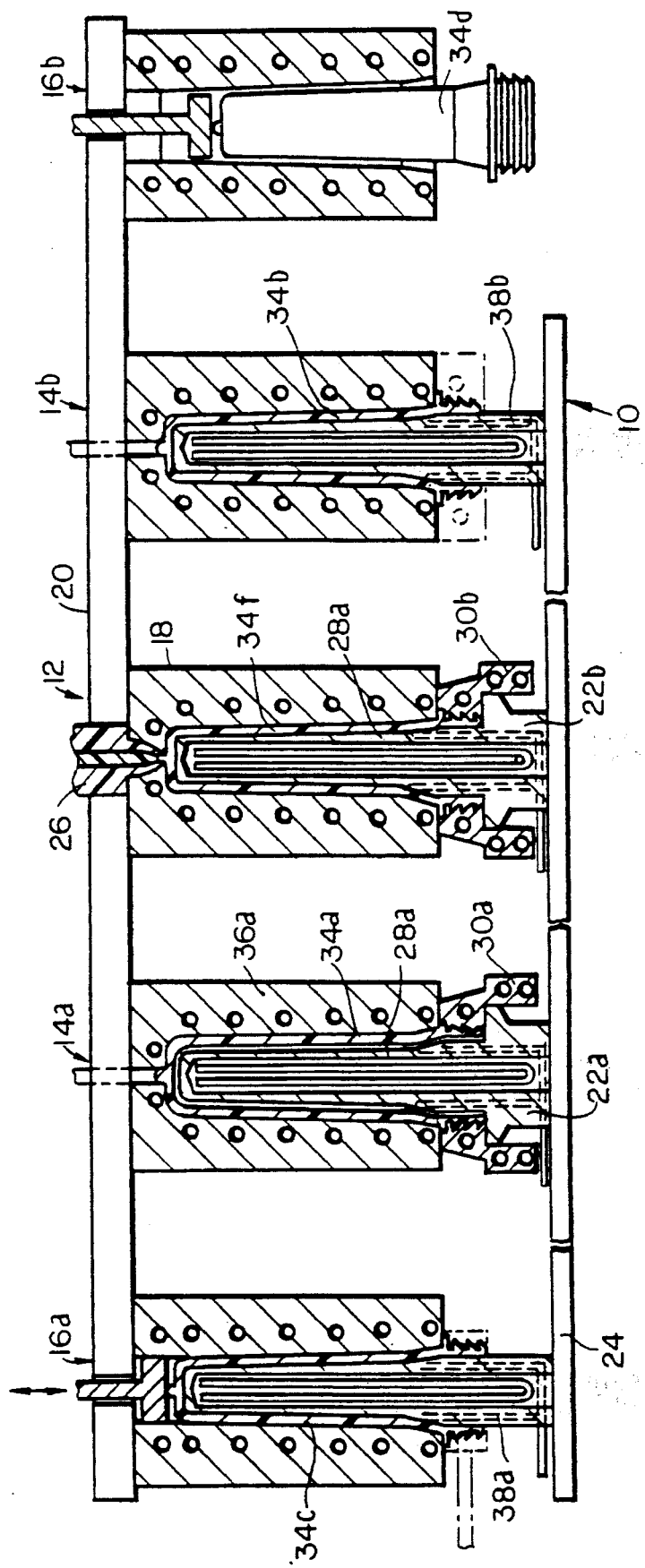
FIG. 4 is a similar plan view with the press clamped and the aligned core rod assembly inserted into the injection mold to start the next parison injection molding cycle.

The indexing plate 24 will thereafter be reciprocated axially to place core rod assembly 22b with closed neck mold 30b in association with injection mold 18 as shown in FIG. 4. Parison 34a will be placed in cooling mold 36a at station 14a while on core rod 28a and closed neck mold 30a. Core rod assembly 38b will be inserted in parison 34b while core rod assembly 38a will transfer parison 34c to ejection station 16a. During this indexing step, the various parisons will be further cooled. The next parison injection molding cycle will commence to form parison 34f. The indexing sequence previously described will be repeated to eventually associate core rod assembly 22a once again with the mold 18 of injection molding station 12.

As explained, at stations 14a and 14b, the space between the cooling cavity and outer parison wall allows the preform parison to be blown off the associated core rods 28a, 28b or separated from the core rods 28a, 28b. The blow air forces the parison against the wall of the cooling cavity to remove the heat from the plastic parison while freeing it from the core rod.

In those applications that do not have the parison blown off the core rod, the plastic parison is forced against the cooling cavity wall by the core rod by a form of compression molding. In this case, both the core rod and cooling cavity remove heat from parison. In this embodiment, the cooling cavity walls may not be tapered. They could be straight or have undercut rings to hold the parison in the cooling cavity when the core rod is withdrawing.

In a further embodiment, the present invention contemplates the cooling molds 36a and 36b being split or in two halves. In this case, the cooling cavity grabs and locks the parison to thereby cool it while allowing the core to be removed.

In all cases, a further cooling core assembly 38a, 38b enters the parison while it is cooling in the cooling cavity. This is a form of compression molding as well. The cooling core rod assembly 38a, 38b also remove heat. The cooling core rod assemblies 38a, 38b may have undercut rings or may be straight. This allows the core rod assemblies 38a, 38b to grip the inside of the parison to pull it from cooling cavity.

As the process proceeds, adequately cooled parisons will be collected without fear or concern over them sticking or distorting.

Although a single row of stations are illustrated in the drawings, it should be understood that multiple rows of such stations may be on the plates 20 and 24 not only in a horizontally disposed line as illustrated, but vertical or in parallel lines; and similarly, the plates 20 and 24 could be horizontally disposed rather than being vertical as shown where desired or necessary.

The cooled parisons may be transported to a blow-molding location where the parsons are reheated, seasoned, oriented and stretched and blow molded into the desired configuration.

Thus, the several aforenoted objects and advantages are more effectively attained. Although a single somewhat preferred embodiment has been disclosed in detail herein, it should be understood that the invention is in no sense limited thereby but its scope is to be determined by that of the appended claims.

I claim:

1. A method of injection molding and cooling a parison sufficiently to prevent distortion and deformation thereof within a minimum injection molding cycle time for optimum parison production, comprising;

injection molding a first parison at an injection molding station;

transferring the first parison to a first parison cooling station at which the first parison is cooled, the first cooling station having a cooling mold having a cavity substantially conforming to the shape of the first parison;

supporting the first parison throughout its length on and cooling the first parison by a first core rod assembly while at the injection molding station, during transfer to the first parison cooling station and while at the first parison cooling station;

injection molding a second parison at the injection molding station after the first parison is transferred to the first parison cooling station;

transferring the second parison to a second parison cooling station at which the second parison is cooled while the first parison remains at the first parison cooling station, the second cooling station having a cooling mold having a cavity substantially conforming to the shape of the second parison;

supporting the second parison throughout its length on and cooling the second parison by a second core rod assembly while at the injection molding station, during transfer to the second parison cooling station and while at the second parison cooling station;

disassociating the first core rod assembly from the first parison at the first parison cooling station while the first parison continues to be cooled and moving the first core rod assembly back to the injection molding station in synchronism with the movement of the second core rod assembly with the second parison supported thereon from the injection molding station to the second parison cooling station;

associating a third core rod assembly with the first parison at the first parison cooling station while the first parison continues to be cooled in synchronism with the return of the first core rod assembly to the injection molding station;

transferring the first parison to a first ejection station in synchronism with the movement of the first core rod assembly to the first parison cooling station;

supporting the first parison throughout its length on and cooling the first parison by the third core assembly while at the first parison cooling station, during transfer to the first ejection station and while at the first ejection station;

disassociating the third core rod assembly from the first parison at the first ejection station and moving the third core rod assembly back to the first parison cooling station in synchronism with the movement of the first core rod assembly from the first parison cooling station back to the injection molding station;

injection molding a third parison at the injection molding station;

transferring the third parison to the first parison cooling station while being supported by the first core rod assembly in synchronism with the transfer of the first parison from the first parison cooling station to the first ejection station;

disassociating the second core rod assembly from the second parison at the second parison cooling station while the second parison continues to be cooled and moving the second core rod assembly back to the injection molding station in synchronism with the movement of the first core rod assembly with the third parison supported thereon from the injection molding station to the first parison cooling station;

associating a fourth core rod assembly with the second parison at the second parison cooling station while the second parison continues to be cooled in synchronism with the return of the second core rod assembly to the injection molding station;

transferring the second parison to a second ejection station in synchronism with the movement of the second core rod assembly to the second parison cooling station;

supporting the second parison throughout its length on and cooling the second parison by the fourth core rod assembly while at the second parison cooling station, during transfer to the second ejection station and while at the second ejection station;

disassociating the fourth core rod assembly from the second parison at the second ejection station and moving the fourth core rod assembly back to the second parison cooling station in synchronism with the movement of the second core rod assembly from the second parison cooling station to the injection molding station;

prior to the transfer of the third parison to the first ejection station, ejecting the first parison from the first ejection station;

injection molding a fourth parison at the injection molding station;

repeating the recited synchronized cycle of steps of molding, transferring, cooling and ejecting parisons.

2. The invention in accordance with claim 1 wherein the first and second core rod assemblies have associated neck molds for forming a neck on the parisons and disassociating the neck molds form the parison at the cooling stations along with the associated core rod assemblies.

3. The invention in accordance with claim 1 wherein the parisons are continuously cooled from the injection molding station following injection molding to the time of ejection from the ejection station.

4. The invention in accordance with claim 1 wherein the cooling of the parison is increased by interposing more cooling stations between the injection molding station and ejection stations.

5. The invention in accordance with claim 1 wherein the cooling mold is slightly larger than the parisons and the respective core rod assemblies blow the parison into intimate contact with the cooling mold and free the parison from the respective core rod assemblies.

* * * * *